United States Patent
Kojima et al.

(10) Patent No.: US 6,176,460 B1
(45) Date of Patent: Jan. 23, 2001

(54) SEAT SLIDING APPARATUS FOR A VEHICLE

(75) Inventors: Yasuhiro Kojima, Kariyu; Yukifumi Yamada, Toyota; Tadasu Yoshida, Kariya, all of (JP)

(73) Assignee: Aisin Seiki Kabushiki Kaisha, Kariya (JP)

( * ) Notice: Under 35 U.S.C. 154(b), the term of this patent shall be extended for 0 days.

(21) Appl. No.: 09/219,880

(22) Filed: Dec. 24, 1998

(30) Foreign Application Priority Data

Dec. 25, 1997 (JP) .................................................. 9-356982

(51) Int. Cl.$^7$ .................................................. F16M 13/00
(52) U.S. Cl. ............................................ 248/429; 248/430
(58) Field of Search ................................... 248/430, 429, 248/345.1, 424

(56) References Cited

U.S. PATENT DOCUMENTS

| 4,881,774 | * | 11/1989 | Bradley et al. | 248/430 |
| 5,285,993 | * | 2/1994 | Kamata et al. | 248/430 |
| 5,348,261 | * | 9/1994 | Nini | 248/430 |
| 5,370,350 | * | 12/1994 | Okano et al. | 248/430 |
| 5,454,541 | * | 10/1995 | Ito | 248/430 |
| 5,529,397 | * | 6/1996 | Yoshida | 248/430 |

FOREIGN PATENT DOCUMENTS

| 36 14 457 | 11/1987 | (DE) . |
| 5-262172 | 10/1993 | (JP) . |
| 9-164865 | 6/1997 | (JP) . |

* cited by examiner

Primary Examiner—Ramon O. Ramirez
Assistant Examiner—Jerome DeLuca
(74) Attorney, Agent, or Firm—Burns, Doane, Swecker & Mathis, LLP

(57) ABSTRACT

A seat sliding apparatus for a vehicle includes a pair of lower rails for being fixed to a vehicle floor, and a pair of upper rails for being fixed to a vehicle seat each of which is slidably retained on a respective lower rail. Each upper rail includes a base plate portion for being fixed to the vehicle seat, a pair of side wall portions each of which extends from the side edges of the base plate portion in the downward direction, and a pair of engaging portions each of which is formed at the bottom edge of the side wall portion and each of which is engaged with the lower rail. A reinforcing member is also provided and is defined by at least one pair of vertical bracing walls each of which substantially intersects the space between the side wall portions of the upper rail and at least one horizontal plate connecting the top edges of the respective pairs of vertical bracing walls. The horizontal plate is fixed to the base plate portion of the upper rail such that the reinforcing member is disposed in the upper rail.

7 Claims, 5 Drawing Sheets

SEAT SLIDING APPARATUS FOR A VEHICLE

This application corresponds to and claims priority under 35 U.S.C. § 119 with respect to Japanese Application No. 09(1997)-356982 filed on Dec. 25, 1997, the entire content of which is incorporated herein by reference.

FIELD OF THE INVENTION

The present invention generally relates to a vehicle seat apparatus. More particularly, the present invention pertains to a seat sliding apparatus for a vehicle.

BACKGROUND OF THE INVENTION

A known seat sliding apparatus for a vehicle is disclosed in Japanese Patent Laid Open Publication No.5(1993)-262172. This seat sliding apparatus includes a pair of lower rails that are adapted to be fixed to the vehicle floor and a pair of upper rails that are adapted to be fixed to the vehicle seat. Each of the upper rails is slidably retained by one of the lower rails.

The lower rail of this known vehicle seat sliding apparatus includes a base plate portion for being fixed to the vehicle floor, a pair of side wall portions extending upwardly from each of the two lengthwise sides of the base plate portion, and a pair of engaging portions. Each of the engaging portions is formed at an end upper edge of the side wall portions and is engaged with the upper rail.

The upper rails of this seat sliding apparatus include a base plate portion for being fixed to the vehicle seat and a pair of engaging portions. Each of the engaging portions is formed at an end of the base plate portion and extends so as to cover the engaging portion of the lower rail. The engaging portions of the lower rails project from the top of the side walls of the lower rails, and form an inverted U-shape structure. The engaging portions of the upper rails are each formed in a generally U-shaped structure which engage with the engaging portions of the lower rails such that the side wall portions of the lower rails are located between the engaging portions of the upper rail. The base plate portion of an upper rail is connected to an anchor member of the seat belt.

With such a seat sliding apparatus, because the lower rails are disposed in the upper rails, the size of the width of the lower rail must be small relative to that of the upper rails. Therefore the lateral size (i.e., the width) of the base plate portion of the lower rails must be small. Consequently, the lower rails cannot be easily fixed to the vehicle floor. When the base plate portions of the lower rails are enlarged in an attempt to more easily fix the lower rails to the vehicle floor, the upper rails must also be enlarged so that, in effect, the entire seat sliding apparatus must be enlarged to achieve a larger base plate portion.

This problem is addressed in the vehicle seat sliding apparatus disclosed in Japanese Patent Laid Open Publication No. 9(1997)-164865. This seat sliding apparatus includes a pair of upper rails which each include a base plate portion, a pair of side wall portions (for each upper rail) which each extend in the downward direction from each side of the base plate portions, and a pair of engaging portions which are each formed at each of the edges of the side wall portions.

This vehicle seat sliding apparatus further includes a pair of lower rails, each provided with a base plate portion and a pair of engaging portions, with each engaging portion being formed at the side edges of the base plate portion and extending so as to cover each of the engaging portions of the upper rail so that each of the inside walls of the engaging portions of the upper rail is disposed within the respective engaging portions in each of the lower rails.

In this apparatus, when an upward force is applied to the upper rail from the seat belt, the base plate portion of the upper rail may be deformed upwardly such that the side wall portions of the lower rails and the engaging portions topple or bend inwardly. To prevent the upper rail from being disengaged from the lower rail, the thickness of the material of the upper rail must thus be enlarged which undesirably increases the cost and weight of the overall apparatus.

In light of the foregoing, a need exists for a vehicle seat sliding apparatus that is able to prevent the upper rail from being disengaged from the lower rail.

A need also exists for a vehicle seat sliding apparatus that tends to prevent the side walls of the lower rail from deforming, even when a relatively large upward force is applied through the seat belt.

SUMMARY OF THE PRESENT INVENTION

In light of the foregoing, the present invention provides a vehicle seat sliding apparatus having a pair of lower rails for being fixed to a vehicle floor, and a pair of upper rails for being fixed to a vehicle seat, each of which is slidably retained on a respective lower rail. Each upper rail includes a base plate portion for being fixed to the vehicle seat, a pair of side wall portions which extend from the side edges of the base plate portion in the downward direction, and a pair of engaging portions which are each formed at the bottom edge of the side wall portion and engaged with the lower rail. A reinforcing member is also provided and is defined by at least one pair of vertical bracing walls, each of which substantially intersects the space between the side wall portions of the upper rail and at least one horizontal plate connecting the top edges of the respective pairs of vertical bracing walls. The horizontal plate is fixed to the base plate portion of the upper rail such that the reinforcing member is disposed in the upper rail.

According to another aspect of the present invention, a vehicle seat sliding apparatus includes a pair of lower rails adapted to be fixed to the vehicle floor and a pair of upper rails adapted to be fixed to a vehicle seat. Each of the upper rails is slidably retained by one of the lower rails. The upper rails each possess a base plate portion for being fixed to a vehicle seat, a pair of side wall portions each of which extends from the side edges of the base plate portion in the downward direction, and a pair of engaging portions each of which is formed at the bottom edges of the side wall portion and each of which is slidably engaged with the lower rail. At least one reinforcing member is disposed within each upper rail. The reinforcing element includes at least two horizontal plates and at least two pairs of vertical bracing walls. Each vertical bracing wall substantially intersects the space between the side wall portions of the upper rail, and each of the horizontal plates connects the top edges of a respective pair of vertical bracing walls. The reinforcement member further includes at least one connecting plate connecting the two vertical bracing walls facing each other, with each vertical bracing wall being connected by a horizontal plate to a different vertical bracing wall. The horizontal plates are fixed to the base plate portion of the upper rail.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 1:
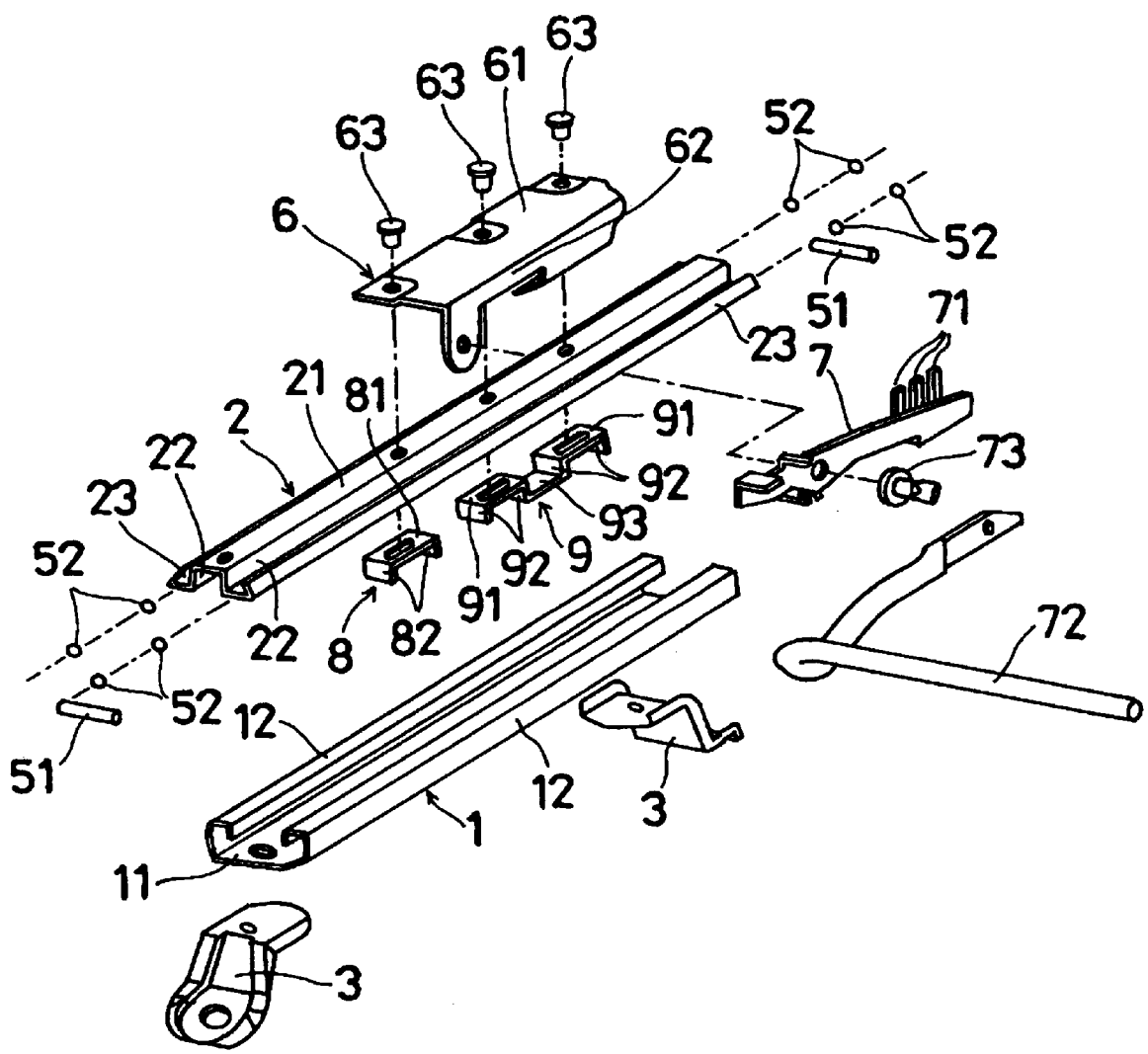
FIG. 1 is an exploded perspective view of the vehicle seat sliding apparatus according to the present invention.
Figure 2:
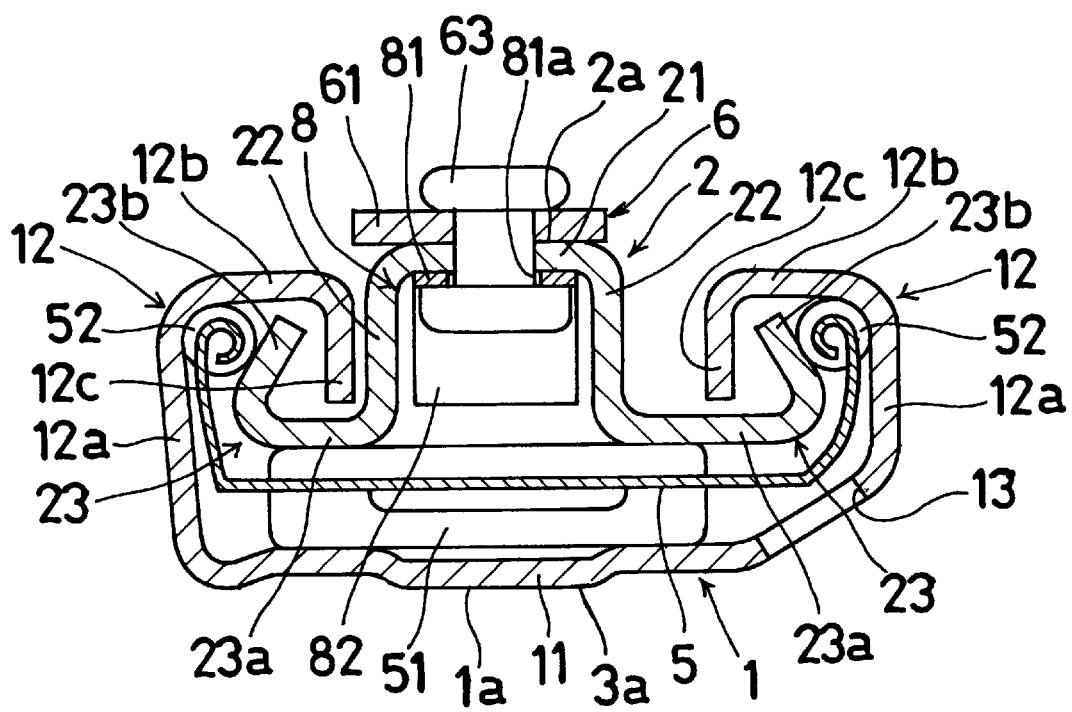
FIG. 2 is a cross-sectional view of one side of the vehicle seat sliding apparatus according to the present invention.

A preferred embodiment of the vehicle seat sliding apparatus of the present invention is shown in FIGS. 1 and 2 and includes a pair of lower rails and a pair of upper rails. It is to be noted that FIGS. 1 and 2 illustrate the lower and upper rails, and other associated features, on one side of the apparatus, it being understood that the apparatus also includes the same structure on the opposite side of the apparatus. The discussion below describing the features and characteristics of one side of the seat sliding apparatus applies equally to the features and characteristics on the opposite side of the seat sliding apparatus.

The vehicle seat sliding apparatus includes a pair of lower rails 1 that are adapted to be fixed to the vehicle floor through a pair of brackets 3. Each lower rail is provided with a base plate portion 11 forming a flat mounting surface 1a and a pair of engaging portions 12. The engaging portions 12 are disposed at the side edges of the base plate portion 11 and are integrally formed with the base plate portion 11. The engaging portions 12 are formed in an inverted U-shaped configuration, first projecting upward from the side edges of the base plate portion 11, then projecting inward and then projecting downward. The inner walls of the engaging portion 12 are thus approximately perpendicular to the base plate portion 11.

Each of the upper rails 2 is adapted to be fixed to the vehicle seat and includes a base plate portion 21 forming a flat mounting surface 2a, a pair of downwardly extending side wall portions 22 disposed at the side edges of the base plate portion 21 and integrally formed with the base plate portion 21, and a pair of engaging portions 23 which project outwardly and at an upward angle from the side wall portions 22. The outward turning and upward inward angling of the engaging portions 23 form engaging portions that are generally U-shaped or V-shaped when viewed in cross-section as seen in FIG. 2. The engaging portions 23 are integrally formed with the side wall portions 22 and the base plate portion 21. The upper rail 2 is fixed to the vehicle seat at the base plate portion 21. In effect, the engaging portion 12 of the lower rail 1 curves around the engaging portion 23 of the upper rail 2.

The side wall portions 22 of the upper rail 2 run lengthwise along the upper rail 2, and extend from the side edges of the base plate portion 21 in the downward direction so as to be located opposite and parallel to each other.

Each of the engaging portions 23 of the upper rail 2 includes an extending portion 23a extending outwardly from the side wall portion 22 so as to be roughly parallel to the base plate portion 11 of the lower rail 1 and a flange portion 23b extending diagonally upward from the side edge of the extending portion 23a so as to be in opposite facing relation to the side wall portion 22. A predetermined distance is thus defined between each flange portion 23a and the facing side wall portion 22 along the length of the side wall portion 22.

Each of the engaging portions 12 of the lower rail 1 includes a vertical portion 12a extending in the upward direction from the base plate portion 11, a top portion 12b extending inwardly from an end of the vertical portion 12a, and a downwardly extending flange portion 12c extending from an end of the top portion 12b. The flange portion 12c of each engaging portion 12 is thus positioned in opposite facing relation to the other flange portion 12c with a predetermined distance being provided between the facing inside surfaces of the two opposing flange portions 12a, 12c.

Each of the engaging portions 23 of the upper rail 2 is covered with one of the engaging portions 12 of the lower rail 1 such that the flange portion 12c is disposed between the side wall portion 22 and the flange portion 23b of the upper rail 2. The flange portion 12c of the lower rail 1 can thus be slidably engageable with the flange portion 23b of the upper rail 2. Therefore, the upper rail 2 is disposed in the lower rail 1 such that the side wall portions 22 of the upper rail 2 are located between the engaging portions 12c of the lower rail 1 and such that the base plate portion 21 of the upper rail 2 is exposed when viewed from the top.

As shown most clearly in FIG. 2, each vertical portion 12a and the top portion 12b of the engaging portion 12 of the lower rail 1 forms an approximate corner or L-shaped element on the outside portions of the engaging portions 12, when viewed in cross-section. Between these corners and respective end portions of the flanges 23b of the engaging portion 23 of the upper rail 2, a plurality of bearings 52 are rotatable disposed. Also, a plurality of rollers 51 are disposed between the engaging portion 23 (at the extending portion 23a) of the upper rail 2 and the base plate portion 11 of the lower rail 1. By virtue of the bearings 52 and the rollers 51, the upper rail 2 is able to smoothly slide along the lower rail 1 in the lengthwise direction of the lower rail 1.

Figure 5:
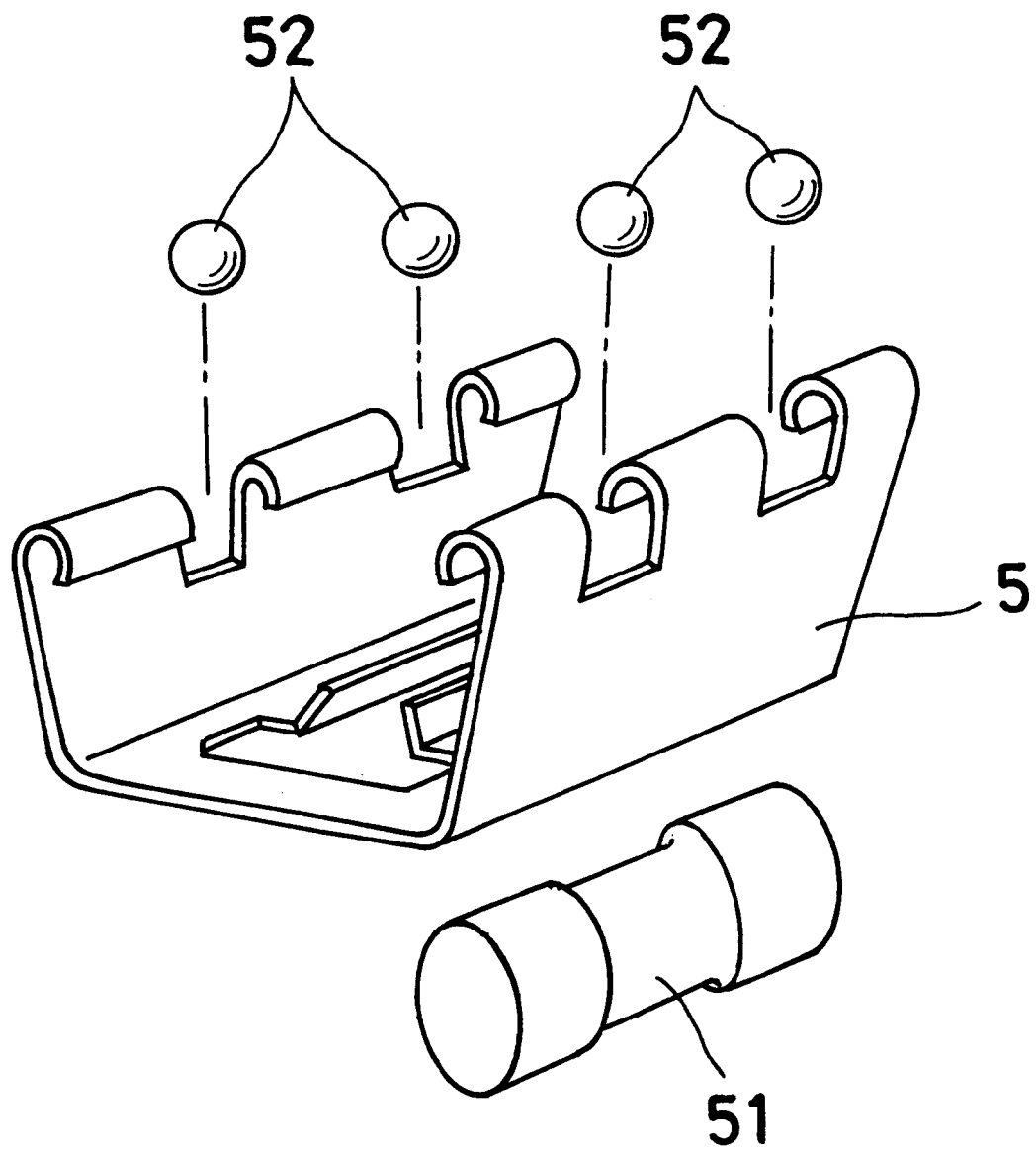
FIG. 5 is a perspective view of the metal plate used in the vehicle seat sliding apparatus accord to the present invention.

FIGS. 2 and 5 illustrate a metal 5 bracket that is used in the seat sliding apparatus of the present invention. A plurality of the metal brackets 5 are used in each seat rail. The metal brackets 5 retain the bearings 52 and the rollers 51 to unite them with respect to each metal bracket 5. The brackets 5 also hold the bearings 52 and rollers 51 in place between the upper rail 2 and the lower rail 1. The positioning of the brackets 5 with respect to the upper and lower rails 2, 1 is shown in FIG. 2.

One of the engaging portions 12 of the lower rail 1 includes a plurality of openings 13 (shown in cross-section in FIG. 2) disposed along the lengthwise direction of the lower rail 1. A bracket 6, having one end that is L-shaped when viewed in cross-section, is fixed to the upper rail 2 with a plurality of pins 63 such that a flat surface 61 of the bracket 6 is in contact with the flat mounting surface 2a of the upper rail 2 as shown in FIG. 2. A vertical portion 62 of the bracket 6 is opposite to one of the vertical portions 12a of the lower rail 1 so as to be parallel to the vertical portion 12a.

Figure 6:
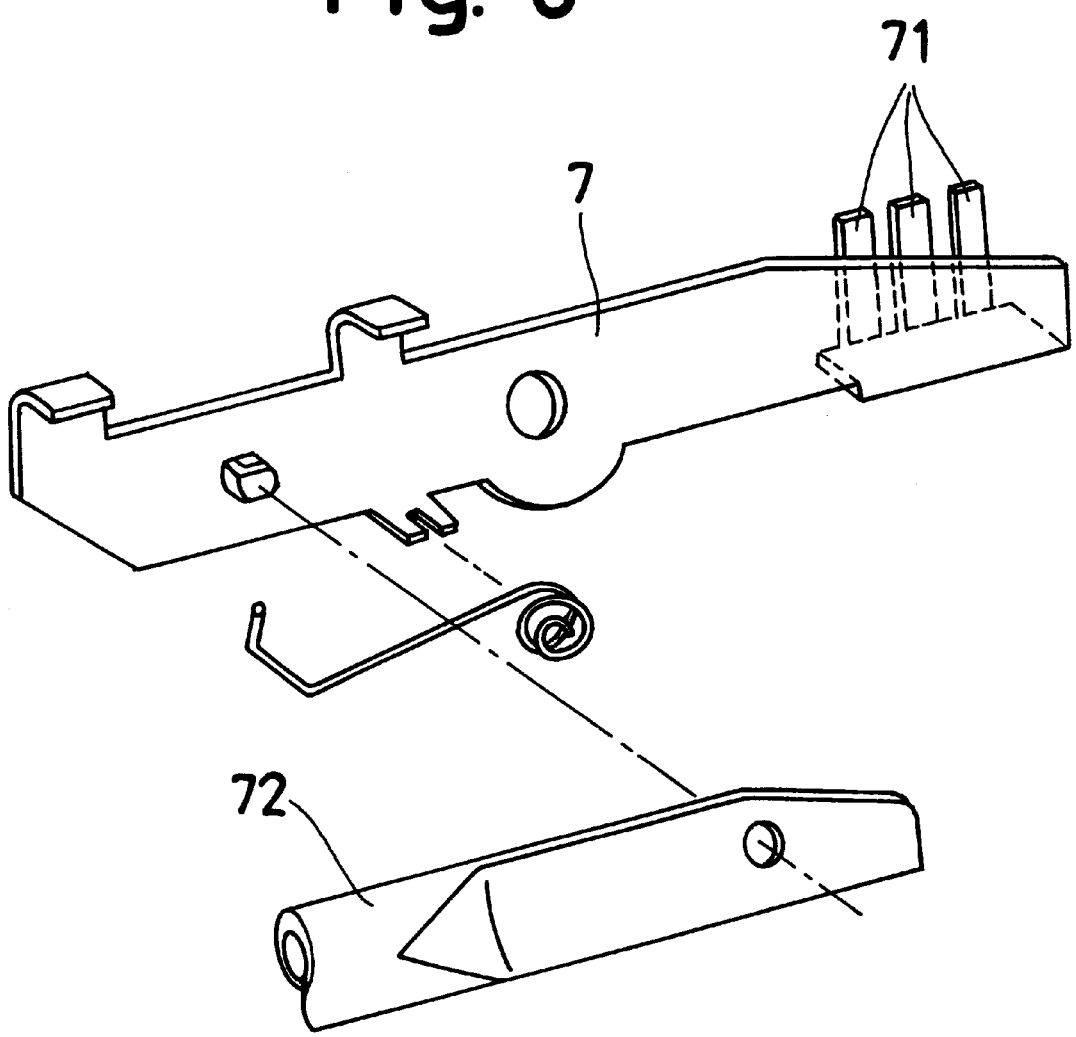
FIG. 6 is a perspective view of the bracket used in the vehicle seat sliding apparatus according to the present invention.

FIGS. 1 and 6 illustrate a lock plate that is used in the seat sliding apparatus of the present invention. The lock plate 7 is rotatably fixed to the vertical portion 62 of the bracket 6 with a pin 73. The lock plate 7 includes a plurality of engaging teeth 71 which are adapted to engage with the openings 13 in the lower rail 1. An operation lever 72 is connected to the lock plate 7 to rotate the lock plate 7 for purposes of engaging and disengaging the teeth 71 of the locking plate 7 with respect to the openings 13. The engagement of the teeth 71 on the lock plate 7 with the openings 13 in the lower rail 1 prohibits sliding movement of the upper rail 2 relative to the lower rail 1, while the disengagement of the teeth 71 on the lock plate 7 from the openings 13 permits sliding movement of the upper rail 2 relative to the lower rail 1. A spring which is shown in FIG. 7 is provided to bias the lock plate 7 towards the engaging portion at which the teeth 71 engage the openings 13.

A lower belt anchor (not shown) which is connected to a seat belt (not shown) is fixed to the flat mounting surface 2a of the upper rail 2 so that a force applied to the seat belt is transmitted to the vehicle floor through the upper rail 2 and the lower rail 1.

Figure 3:
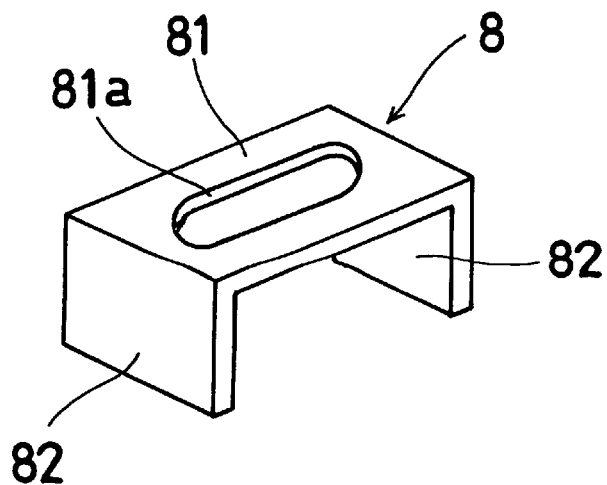
FIG. 3 is a perspective view of the first reinforcement plate used in the vehicle seat sliding apparatus according to the present invention.

As shown in FIGS. 1 and 2, a first reinforcement member 8 and a second reinforcement member 9 are disposed between the side wall portions 22 of the upper rail 2. The first reinforcement member 8, shown in detail in FIG. 3, includes a horizontal plate portion 81 and a pair of vertical braces 82. The horizontal plate portion 81 and the vertical braces 82 are integrally formed in one piece with each other. The horizontal plate portion 81 has a width which is approximately equal to that of the base plate portion 21 of the upper rail 2. The horizontal plate portion 81 possesses a rectangular-shaped configuration so that the long sides of the rectangle extend along the lengthwise direction of the upper rail 2. An oblong or elongated hole 81a is disposed on the horizontal plate portion 81. The hole 81a is elongated in the lengthwise direction of the horizontal plate portion 81.

Each of the vertical braces 82 possesses a rectangular-shaped configuration so as to be disposed between the side wall portions 22 of the upper rail 2. Each of the vertical braces 82 intersects or extends across the space between the side wall portions 22 of the upper rail 2, such that the plane of the surface of each vertical brace 82 is roughly perpendicular to the side walls 22. Each of the vertical braces 82 has a height which is substantially equal to the height of the side wall portions 22 and a width which is substantially equal to the width of the base plate portion 21 of the upper rail 2 (i.e., the space between the side wall portions 22). The vertical braces 82 extend vertically from each of the ends of the horizontal plate portion 81 (or the front and back ends, with reference to the rectangular shape of horizontal plate portion 81).

The first reinforcement plate 8 is fixed to the upper rail 2 by a pin 63 which is inserted through the hole 81a. The first reinforcement plate 8 is fixed to the upper rail 2 such that the horizontal plate portion 81 is in contact with the base plate portion 21 of the upper rail 2, and such that the outside edges of the vertical braces 82 are either in contact with the inside of the side wall portions 22, or are slightly spaced by a predetermined distance from the inside of the side wall portions 22 to form a predetermined gap between such edges and the inside surface of side walls 22. The first reinforcing member 8 is thus disposed between the side wall portions 22 of the upper rail 2.

Figure 4:
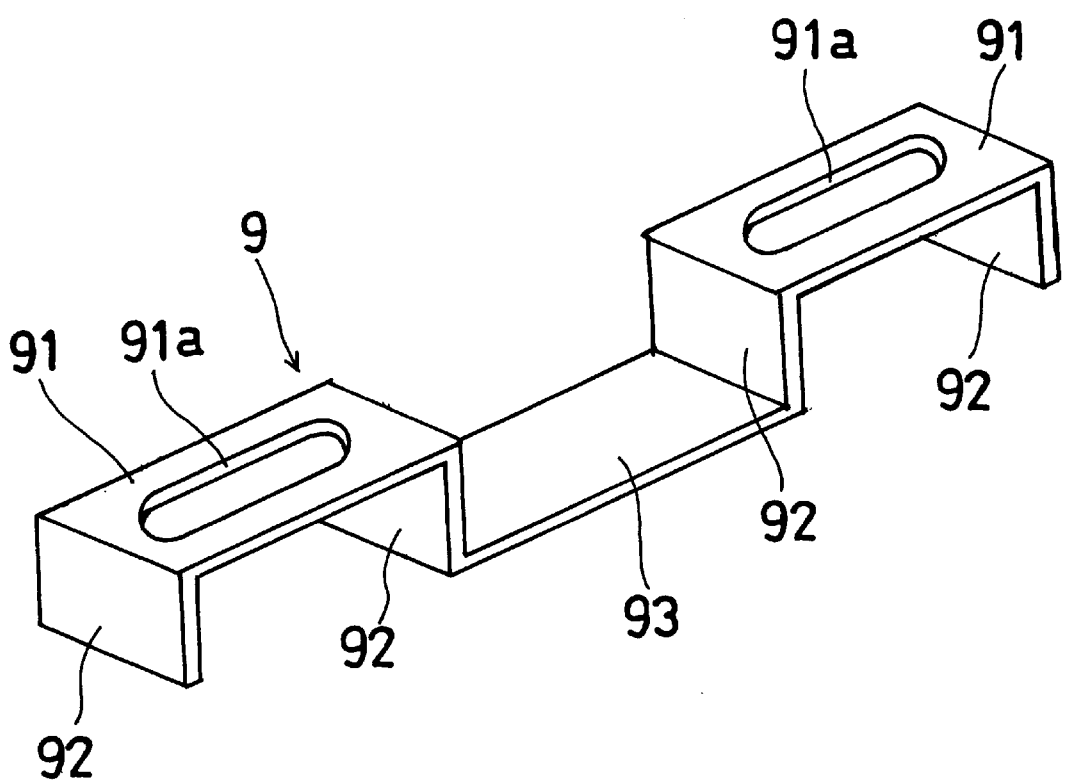
FIG. 4 is a perspective view of the second reinforcement plate used in the vehicle seat sliding apparatus according to the present invention.

The second reinforcement member 9 is illustrated in detail in FIG. 4 and includes a pair of horizontal plate portions 91 and two pairs of vertical braces 92. The horizontal plate portions 91 and the two pairs of vertical braces 92 are integrally formed with each other. The horizontal plate portions 91 are disposed in the same plane, but are set apart from each other with a predetermined distance in the lengthwise direction of the reinforcing member 9. Each of the horizontal plate portions 91 has a width which is substantially equal to that of the base plate portion 21 of the upper rail 2 (i.e., the space between the side wall portions 22). Each of the horizontal plate portions 91 possesses a rectangular-shaped configuration so as to extend along the lengthwise direction of the upper rail 2. An oblong or elongated hole 91a is disposed on each of the horizontal plate portions 91. The holes are elongated in the lengthwise direction of the horizontal plate portions 91.

Each of the vertical braces 92 possesses a rectangular-shaped configuration so as to be disposed between the side wall portions 22. Each of the vertical plate portions 92 intersects or extends across the space between the side wall portions 22 of the upper rail 2. Each of the vertical braces 92 has a height which is substantially equal to the height of the side wall portions 22 of the upper rail 2 and a width which is substantially equal to the width of the base plate portion 21 of the upper rail 2. The braces 92 extend vertically downward from each of the ends (or the front and back edges, with reference to the lengthwise direction of the horizontal plates 91) of the horizontal plate portions 91.

The second reinforcing member 9 also includes a connecting plate 93, the surface of which is in a plane parallel or approximately parallel to the plane of the corresponding horizontal plates 91, but offset from the plane of the corresponding horizontal plates 91. The connecting plate 93 connects the inside vertical braces 92 of the two horizontal plates 91 such that with respect to the second reinforcing member 9, the horizontal plates 91, the vertical plates 92 and the connecting plate 93 are integrally formed as a one-piece unit. Thus, in the above preferred configuration, the connecting plate 93 is located between the second and third vertical braces 92 (i.e., the two middle braces 92) of the second reinforcing member 9.

It is to be understood, however, that more than two pairs of vertical braces can be used. Thus, for example, in a second reinforcing member 9 with three pairs of vertical braces (and three horizontal plates 91 connecting each respective pair), the connecting plates 93 will be between the second and third vertical braces as well as the fourth and fifth vertical braces.

The second reinforcement plate 9 is fixed to the upper rail 2 with one of the pins 63. When the pins 63 are inserted through the holes 91a, the second reinforcement plate 9 is fixed to the upper rail 2 such that the horizontal plate portions 91 are in contact with the base plate portion 21 of the upper rail 2 and such that the outside edges of each of the vertical braces 91 are either in contact with the inside surface of the side wall portions 22, or are slightly spaced by a predetermined distance from the inside of the side wall portions 22 to form a predetermined gap between such edges and the inside surface of side walls 22.

When a force in the upward direction is applied to the upper rail 2 from the seat belt, each of the horizontal plate portions 81 and 91 acts to prevent deformation of the base plate portion 21 of the upper rail 2, by effectively increasing the thickness of the base plate portion 21 of the upper rail 2. Further, each of the vertical braces 82 and 92 functions as a brace between the side wall portions 22 of the upper rail 2. This helps prevent the side wall portions 22 and the engaging portions 23 of the upper rail 2 from being deformed inwardly. The reinforcement elements 8, 9, 12 are thus able to provide a dual function.

When an upward force is applied to upper rail 2, each of the flange portions 23b of the engaging portion 23 of the upper rail 2 receives the reaction force through the bearings 52 such that the flange portion 23b is stiffly engaged with the flange portion 12c of the lower rail 1. Therefore, such a force in the upper direction applied to the upper rail 2 is efficiently transmitted to the lower rail 1 so as not to detach the upper rail 2 from the lower rail 1.

It is to be understood as noted above that the second reinforcement plate 9 may include three or more horizontal plate portions 91 and three or more pairs of vertical plate portions 92 which are connected to each other with a plurality of connecting plates 93. Also, instead of using a combination of the first reinforcing member 8 and the second reinforcing member 9, it is possible to employ several of just the first reinforcement plates 8, or just the second reinforcement member 9, or more than one second reinforcing member 9.

The present invention thus provides a vehicle seat sliding apparatus that is well suited for preventing the upper rail from being disengaged from the lower rail. Further, the vehicle seat sliding apparatus of the present invention is well suited to preventing the side walls of the lower rail from deforming, even when a relatively large upward force is applied through the seat belt.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat sliding apparatus for a vehicle comprising:
   a pair of lower rails for being fixed to a vehicle floor;
   a pair of upper rails for being fixed to a vehicle seat each of which is slidably retained by one of the lower rails, respectively, and each rail including a horizontal base plate portion for being fixed to a vehicle seat, a pair of vertical side wall portions each of which extends from a side edge of the base plate portion in a downward direction and a pair of engaging portions each of which is formed at a bottom edge of one side wall portion and each of which is slidably engaged with the lower rail; and
   one or more reinforcing members disposed in each of the upper rails, said reinforcing member comprising a pair of vertical bracing walls each of which substantially intersects a space between the side wall portions of the upper rail and a horizontal plate connecting the top edges of the vertical bracing walls, which horizontal plate is fixed to the base plate portion of the upper rail.

2. A seat sliding apparatus for a vehicle as recited in claim 1, wherein at least one second reinforcing member disposed within each upper rail includes at least two horizontal plates and at least two pairs of vertical bracing walls, each of which vertical bracing walls substantially intersects a space between the side wall portions of the upper rail, each of the horizontal plates connecting top edges of a respective pair of vertical bracing walls, the second reinforcement member further including at least one connecting plate connecting the two vertical bracing walls facing each other, each of said vertical bracing walls being connected to a different vertical bracing wall, the horizontal plates being fixed to the base plate portion of the upper rail.

3. A seat sliding apparatus for a vehicle as recited in claim 1, wherein each lower rail includes a base plate for being fixed to the vehicle floor and a pair of engaging portions each of which extends from a side edge of the base plate to cover the engaging portions of the upper rail, each of the engaging portions of the upper rail are disposed between the engaging portions of the lower rail.

4. A seat sliding apparatus for a vehicle as recited in claim 1, further comprising a plurality of rollers each of which is disposed between the engaging portions of the upper rail and the base plate of the lower rail and a plurality of bearings each of which is disposed between the engaging portions of the upper rail and the engaging portions of the lower rail.

5. A seat sliding apparatus for a vehicle comprising:
   a pair of lower rails for being fixed to a vehicle floor;
   a pair of upper rails for being fixed to a vehicle seat each of which is slidably retained by one of the lower rails, respectively, and each upper rail including a horizontal base plate portion for being fixed to a vehicle seat, a pair of vertical side wall portions each of which extends from a side edge of the base plate portion in a downward direction and a pair of engaging portions each of which is formed at a bottom edge of one side wall portion and each of which is slidably engaged with the lower rail; and
   at least one reinforcing member is disposed within each upper rail including at least two horizontal plates and at least two pairs of vertical bracing walls, each of which vertical bracing walls substantially intersects a space between the side wall portions of the upper rail, each of the horizontal plates connecting the top edges of a respective pair of vertical bracing walls, the reinforcement member further including at least one connecting plate connecting the two vertical bracing walls facing each other, each of said vertical bracing walls being connected to a different vertical bracing wall, the horizontal plates being fixed to the base plate portion of the upper rail.

6. A seat sliding apparatus for a vehicle as recited in claim 5, wherein each lower rail includes a base plate for being fixed to the vehicle floor and a pair of engaging portions each of which extends from a side edge of the base plate to cover one of the engaging portions of the respective upper rail, each of the engaging portions of the lower rail being slidably engaged with the upper rail such that the side wall portions of the upper rail are disposed between the engaging portions of the lower rail.

7. A seat sliding apparatus for a vehicle as recited in claim 5, further comprising a plurality of rollers each of which is disposed between the engaging portions of each upper rail and the base plate of each lower rail and a plurality of bearings each of which is disposed between the engaging portions of each upper rail and the engaging portions of each lower rail.

* * * * *